US011984056B2

(12) United States Patent
He

(10) Patent No.: US 11,984,056 B2
(45) Date of Patent: May 14, 2024

(54) DRIVING METHOD, DRIVER DEVICE, AND DISPLAY TERMINAL OF A DISPLAY PANEL

(71) Applicant: Wuhan China Star Optoelectronics Technology Co., Ltd., Wuhan (CN)

(72) Inventor: Jian He, Wuhan (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 0 days.

(21) Appl. No.: 17/259,569

(22) PCT Filed: Nov. 17, 2020

(86) PCT No.: PCT/CN2020/129380
§ 371 (c)(1),
(2) Date: Jan. 12, 2021

(87) PCT Pub. No.: WO2022/088292
PCT Pub. Date: May 5, 2022

(65) Prior Publication Data

US 2023/0316981 A1 Oct. 5, 2023

(30) Foreign Application Priority Data

Nov. 2, 2020 (CN) ........................ 202011202965.0

(51) Int. Cl.
*G09G 3/20* (2006.01)

(52) U.S. Cl.
CPC ......... *G09G 3/2074* (2013.01); *G09G 3/2092* (2013.01); *G09G 2310/0251* (2013.01); *G09G 2310/0297* (2013.01); *G09G 2320/0242* (2013.01)

(58) Field of Classification Search
CPC ......... G09G 3/2092; G09G 2310/0251; G09G 3/2074; G09G 2310/0297; G09G 3/3225; G09G 2320/0242; G09G 3/3648
See application file for complete search history.

(56) References Cited

U.S. PATENT DOCUMENTS

| | | | | |
|---|---|---|---|---|
| 11,100,890 | B1 * | 8/2021 | Levin | G09G 3/20 |
| 2009/0002280 | A1 | 1/2009 | Kim et al. | |
| 2015/0237236 | A1 * | 8/2015 | Elliott | G06T 5/003 345/600 |

(Continued)

FOREIGN PATENT DOCUMENTS

| | | | |
|---|---|---|---|
| CN | 101013561 | A | 8/2007 |
| CN | 104991389 | A | 10/2015 |

(Continued)

*Primary Examiner* — Muhammad N Edun
(74) *Attorney, Agent, or Firm* — Nathan & Associates; Menachem Nathan

(57) ABSTRACT

A driving method, a device, and a display terminal of a display panel are proposed. A charging order is sorted for each row of sub-pixels among the plurality of sub-pixels, so that total numbers of different color sub-pixels arranged at a target position are the same, wherein the target position comprises a first bit and a last bit in the charging order corresponding to each row of sub-pixels. When the sub-pixels in each row are scanned, each sub-pixel in a row is charged to drive the display panel according to the charging order corresponding to the row, thereby the display panel is driven.

15 Claims, 4 Drawing Sheets

(56) References Cited

U.S. PATENT DOCUMENTS

| | | | | |
|---|---|---|---|---|
| 2018/0240389 | A1 | 8/2018 | Li et al. | |
| 2018/0277053 | A1 | 9/2018 | Zhao | |
| 2020/0105178 | A1 | 4/2020 | Han et al. | |
| 2020/0211486 | A1 * | 7/2020 | Wang .................. | G09G 3/3614 |
| 2020/0302846 | A1 | 9/2020 | Zheng et al. | |

FOREIGN PATENT DOCUMENTS

| | | | |
|---|---|---|---|
| CN | 106097955 | A | 11/2016 |
| CN | 106297640 | A | 1/2017 |
| CN | 106842657 | A | 6/2017 |
| CN | 107863062 | A | 3/2018 |
| CN | 107886885 | A | 4/2018 |
| CN | 108335663 | A | 7/2018 |
| CN | 108648681 | A | 10/2018 |
| CN | 108877641 | A | 11/2018 |
| CN | 109859712 | A | 6/2019 |
| CN | 109872678 | A | 6/2019 |

* cited by examiner

DRIVING METHOD, DRIVER DEVICE, AND DISPLAY TERMINAL OF A DISPLAY PANEL

CROSS REFERENCE OF RELATED APPLICATION

This application is a US national phase application based upon an International Application No. PCT/CN2020/129380, filed on Nov. 17, 2020, which claims the priority of Chinese Patent Application No. 202011202965.0, entitled “DRIVING METHOD, DRIVER DEVICE, AND DISPLAY TERMINAL OF A DISPLAY PANEL”, filed on Nov. 2, 2020, the disclosure of which is incorporated herein by reference in its entirety.

BACKGROUND

The application relates to the technical field of display panel, in particular to a driving method, device, and display terminal of a display panel.

Multi-channel multiplexing technology (MUX) for source driver signals has been widely used in display panels. Through channel multiplexing, port number of source signals at integrated circuit (IC) end can be reduced. The approach has two advantages. Firstly, number of IC utilizations can be reduced. Secondly, size of bottom border of the display panels is decreased, so that design goals for cost reduction and increased product competitiveness can be achieved.

However, the channel multiplexing technology has some disadvantages, such as reduced charging time for sub-pixels. In high pixel density (PPI) products, charging time is often a constraint factor, and a load is induced by channel multiplexing, which delays a signal so that charging time is further squeezed. When the sub-pixels are scanned row by row, signal timing out from the multi-channel is fixed, resulting in charging rate deviation for different sub-pixels.

For example, when each row of sub-pixels is scanned, multiple channels successively output signals to charge three sub-pixels R (red), G (green), and B (blue). A latency, however, inevitably exists between a scan signal of each row of sub-pixels. That is, the latency happens when the scan signal changes from low-level to high-level and from high-level to low-level. As a result, the charging time of the sub-pixel G in each row is longer than that of the sub-pixels R or B. When the charging rate is underrun, a charging rate deviation is likely to cause uneven display effects and horizontal/vertical stripes.

SUMMARY

Embodiments of the application propose a driving method, a driver device, and a display terminal of a display panel to solve the problem of uneven display caused by charging rate deviation caused by charging rate underrun in the prior art.

An embodiment of the application proposes a driving method for a display panel, the display panel comprises a plurality of sub-pixels distributed in multiple rows and columns, and the plurality of sub-pixels comprises a variety of color sub-pixels. The method comprises the following steps:

A charging order is sorted for each row of sub-pixels among the plurality of sub-pixels, so that total numbers of different color sub-pixels arranged at a target position are the same. The target position comprises a first bit and a last bit in the charging order corresponding to each row of sub-pixels.

When scanning the sub-pixels in each row, each sub-pixel in a row is charged to drive the display panel according to the charging order corresponding to the row.

Furthermore, the target position may comprise a first position and a second position. The first position may comprise the first bit in the charging order corresponding to each row of sub-pixels, and the second position comprises the last bit in the charging order corresponding to each row of sub-pixels.

The total numbers of different color sub-pixels among the plurality of sub-pixels arranged at the first position may be the same, and the total numbers of different color sub-pixels among the plurality of sub-pixels arranged at the second position may also be the same.

Furthermore, the sorting of the charging order for each row of sub-pixels among the plurality of sub-pixels may comprise the following steps.

Each row of sub-pixels among the plurality of sub-pixels may be sorted by color or column number of each sub-pixel.

Furthermore, the display panel further comprises a plurality of multiplexing channels.

The charging order for each row of sub-pixels among the plurality of sub-pixels is sorted so that total numbers of different color sub-pixels arranged at a target position are the same, which may further comprise the following steps.

Multiple rows of sub-pixels may be divided into a plurality of groups so that the number of rows in each group coincides the number of the multiplexing channels.

Each row of sub-pixels in each group may be sorted so that total numbers of different color sub-pixels in each group arranged at the target position are the same.

Furthermore, the charging orders of different groups of rows may be the same or different.

Furthermore, the charging orders corresponding to different rows of sub-pixels may be the same or different.

Embodiments of the application also proposes a driver device for a display panel, wherein the display panel comprises plurality of sub-pixels arranged in rows and columns, and the sub-pixels comprise various color sub-pixels. The driver device may comprise the following elements.

A sorting module, for sorting a charging order for each row of sub-pixels among the plurality of sub-pixels, so that total number of different color sub-pixels arranged at a target position are the same, and the target position comprises a first bit and a last bit in the charging order corresponding to each row of sub-pixels.

A driver module, adaptable for charging each sub-pixel of a row based on the charging order corresponding to the row when scanning each row of sub-pixels, so as to drive the display panel.

Furthermore, the target position may comprise a first position and a second position, the first position comprises the first bit in the charging order corresponding to each row of sub-pixels, and the second position may comprise the last bit in the charging order corresponding to each row of sub-pixels.

The total numbers of different color sub-pixels among the plurality of sub-pixels arranged at the first position are the same, and the total numbers of different color sub-pixels among the plurality of sub-pixels arranged at the second position are the same.

Furthermore, the sorting module is also adaptable for the following function:

The sorting module sorts each row of sub-pixels among the plurality of sub-pixels by color or column number of each sub-pixel.

Furthermore, the display panel may further comprise a plurality of multiplexing channels.

The sorting module is also adaptable for the following functions:

The sorting module divides multiple rows of sub-pixels into a plurality of groups so that the number of rows in each group coincides the number of the multiplexing channels; and The sorting module sorts charging orders for each row of sub-pixels in each group so that total numbers of different color sub-pixels in each group arranged at the target position are the same.

Furthermore, the charging orders of different groups of rows are the same or different.

Furthermore, the charging orders corresponding to different rows of sub-pixels are the same or different.

Embodiments of the application also proposes a display terminal, comprising a display panel, wherein the display panel comprises plurality of sub-pixels arranged in rows and columns, and the sub-pixels comprise various color sub-pixels, the display terminal also comprises a processor and a memory, the memory is adaptable for storing instructions and data, and the processor is adaptable for performing the following steps:

- sorting a charging order for each row of sub-pixels among the plurality of sub-pixels, so that total numbers of different color sub-pixels arranged at a target position are the same, and the target position comprises a first bit and a last bit in the charging order corresponding to each row of sub-pixels; and
- when scanning the sub-pixels in each row, charging each sub-pixel in a row to drive the display panel according to the charging order corresponding to the row.

Furthermore, the target position comprises a first position and a second position, the first position comprises the first bit in the charging order corresponding to each row of sub-pixels, and the second position comprises the last bit in the charging order corresponding to each row of sub-pixels.

The total numbers of different color sub-pixels among the plurality of sub-pixels arranged at the first position may be the same, and the total numbers of different color sub-pixels among the plurality of sub-pixels arranged at the second position may be the same.

Furthermore, the processor sorts the charging order for each row of sub-pixels among the plurality of sub-pixels, comprising the steps of:

Sorting each row of sub-pixels among the plurality of sub-pixels by color or column number of each sub-pixel.

Furthermore, the display panel may comprise a plurality of multiplexing channels.

The processor sorts the charging order for each row of sub-pixels among the plurality of sub-pixels, so that total numbers of different color sub-pixels arranged at a target position are the same, comprising the steps of:

- Dividing multiple rows of sub-pixels into a plurality of groups so that the number of rows in each group coincides the number of the multiplexing channels; and
- Sorting charging orders for each row of sub-pixels in each group so that total numbers of different color sub-pixels in each group arranged at the target position are the same.

Furthermore, the charging orders of different groups of rows are the same or different.

Furthermore, the charging orders corresponding to different rows of sub-pixels are the same or different.

The beneficial effects of the application are as follows. The sorting is carried out for each row of sub-pixel in the multi-row sub-pixel, so that the total numbers of different color sub-pixels arranged at the target position are the same. The target position comprises a first bit and a last bit in the charging order corresponding to each row of sub-pixels. When scanning the sub-pixels in each row, charging each sub-pixel in a row to drive the display panel according to the charging order corresponding to the row to ensure that the overall charging rate of different color sub-pixels are the same, such that the uneven display such as horizontal and vertical stripes can be prevented, and the display quality of the display panel can be improved.

BRIEF DESCRIPTION OF THE DRAWINGS

The technical solution and other beneficial effects of the application will be obvious through the detailed description of the specific implementation mode of the application in combination with the attached drawings.

DETAILED DESCRIPTION

The specific structural and functional details disclosed herein are only representative and are for the purpose of describing exemplary embodiments of the present application. However, the present application can be realized in many alternative forms, which shall not be interpreted as limited only to the embodiments described herein.

In the description of the present application, it should be understood that the orientation or position relationship indicated by the terms “center”, “horizontal”, “upper”, “lower”, “left”, “right”, “vertical”, “horizontal”, “top”, “bottom”, “inside” and “outside” are based on the position or position relationship shown in the attached drawings, which is only for the convenience of describing the application and simplifying the description, not for the sake of simplifying the description. The device or element indicated or implied must have a specific orientation constructed and operated in a specific orientation, and therefore cannot be understood as a limitation of the present application. In addition, the terms “first” and “second” are used only for the purpose of description and cannot be understood as indicating or implying relative importance or implicitly indicating the number of technical features indicated. Thus, the features defined as “first” and “second” may explicitly or implicitly include one or more of the features. In the description of this application, unless otherwise specified, "multiple" means two or more. In addition, the term "including" and any variation thereof is intended to cover exclusive inclusion.

In the description of this application, it should be noted that, unless otherwise specified and limited, the terms "installation", "connection" and "connection" shall be understood in a broad sense. For example, it may be a supporting connection, a detachable connection, or an integrated connection; it may be a mechanical connection or an electrical connection; it may be a direct connection or an indirect connection through an intermediate medium. The connection can be an internal connection of two components. For those of ordinary skill in the art, the specific meaning of the above terms in the application can be understood according to specific circumstances.

The terms used herein are intended to describe specific embodiments only and are not intended to limit exemplary embodiments. The singular forms "a" and "one" used here are intended to include the plural unless the context clearly indicates otherwise. It should also be understood that the terms "including" and/or "comprising" as used herein specify the existence of the stated features, integers, steps, operations, units and/or components without excluding the existence or addition of one or more other features, integers, steps, operations, units, components and/or combinations thereof.

The present application is further described in combination with the drawings and the embodiment.

Figure 1:
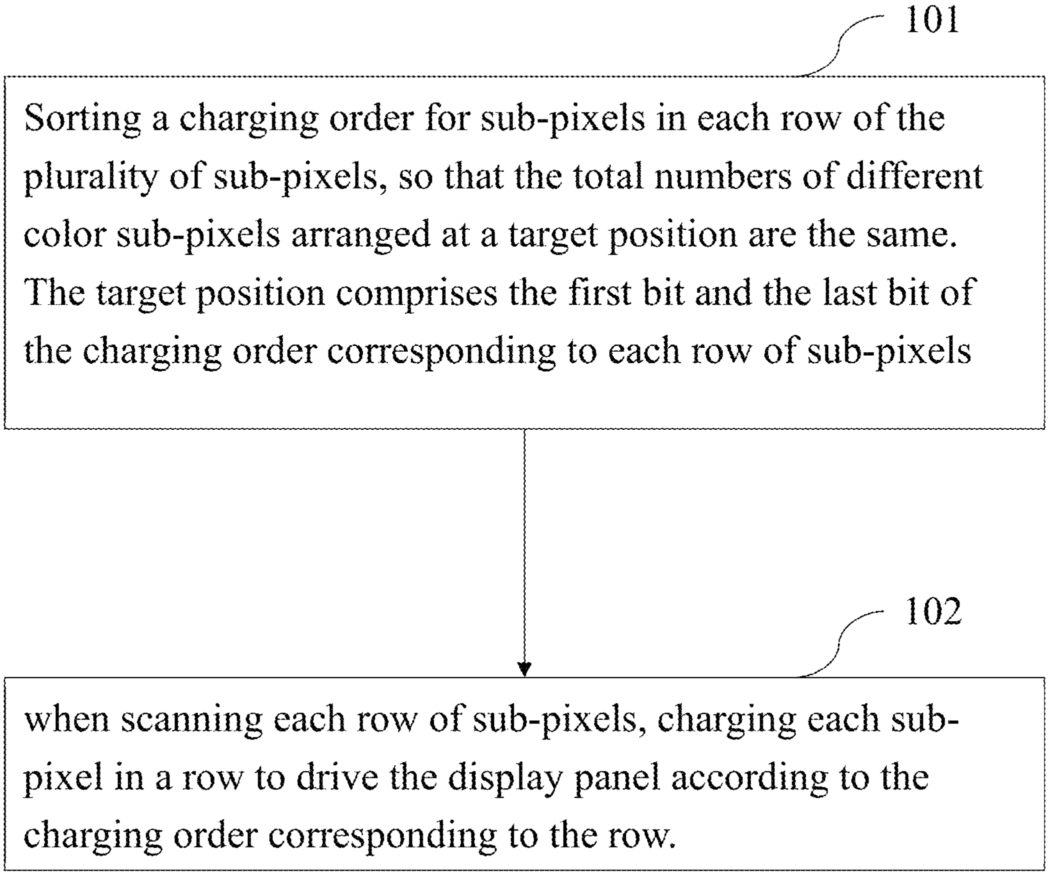
FIG. 1 is a flowchart of a driving method of a display panel according to an embodiment of the present application.

As shown in FIG. 1, an embodiment of the application provides a driving method for a display panel. Wherein, the display panel comprises a number of sub-pixels distributed in multiple rows and columns, and the plurality of sub-pixels comprise a variety of color sub-pixels. Each row of sub-pixels corresponds to a scanline, so that when a row of sub-pixels is scanned, a scan signal is input through a scanline corresponding to the sub-pixels. Each column of sub-pixels corresponds to a data line, so that when each row of sub-pixels is scanned, data signals are input to each sub-pixel in the row through data lines corresponding to each sub-pixel of each column to charge the sub-pixels respectively. Each row of sub-pixels comprises multiple color sub-pixels, and sub-pixels in the same column are of the same color.

The display panel also comprises a plurality of multiplexing channels. Each multiplexing channel corresponds to a plurality of data lines. When each row of sub-pixels is scanned, the multiplexing channels successively output multiplex signals. The plurality of multiplexed signals output from each multiplexing channel are transmitted to corresponding multiple data lines, so that the multiple data lines can simultaneously transmit data signals to corresponding sub-pixels.

Figure 2:
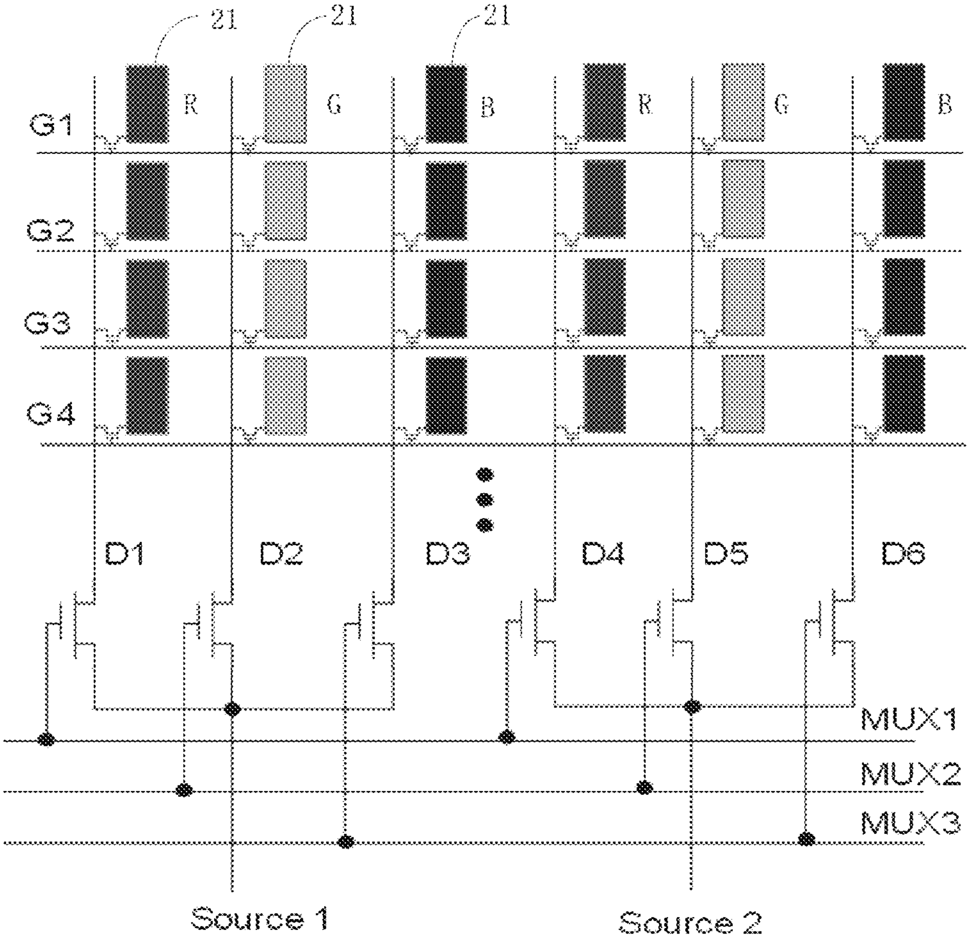
FIG. 2 is a structural diagram of a plurality of pixels in the display panel according to an embodiment of the present application.

For example, as shown in FIG. 2, the display panel comprises a plurality of sub-pixels 21 arranged in six rows by multiple columns. The sub-pixels 21 in the first row to fourth row are corresponded to the scanlines G1, G2, G3, G4, respectively. The sub-pixels 21 in the first column to the sixth column correspond to the data lines D1, D2, D3, D4, D5 and D6, respectively. Each row of sub-pixels comprises red sub-pixels R, green sub-pixels G, and blue sub-pixels B, and the sub-pixels 21 in the first and fourth columns are red sub-pixels R, the sub-pixels 21 in the second and fifth columns are green sub-pixels G, and sub-pixels 21 in third and sixth columns are blue sub-pixels B. The display panel also comprises three multiplex channels MUX1, MUX2, and MUX3, wherein the multiplexing channel MUX1 corresponds to the data lines D1 and D4, that is, the multiplex channel MUX1 can charge the sub-pixels 21 in the first column through the data line D1, charge the sub-pixels 21 in the fourth column through the data line D4, and the multiplex channel MUX2 corresponds to the data lines D2 and D5, that is, the multiplexing channel MUX2 can charge the sub-pixels 21 in the second column through the data line D2 and the sub-pixels 21 in the fifth column through the data line D5. The multiplexing channel MUX3 corresponds to data lines D3 and D6, that is, the multiplexing channel MUX3 can charge sub-pixels 21 in the third column through data line D3, and sub-pixels 21 in the sixth column through data line D6.

As shown in FIG. 1, the driving method of the display panel according to an embodiment of the application comprises steps 101 to 102, and the details are as follows.

In step 101, a charging order is sorted for sub-pixels in each row of the plurality of sub-pixels, so that the total numbers of different color sub-pixels arranged at a target position are the same. The target position comprises the first bit and the last bit of the charging order corresponding to each row of sub-pixels.

In this embodiment, each sub-pixel in each row of sub-pixels is sorted, and the charging order in different row sub-pixel can be different. Wherein, the charging order being sorted is referred to as a sequence to charge each sub-pixel in a row.

Specifically, the sorting of the charging order for each row of sub-pixels among the plurality of sub-pixels may be performed in the following step:

Each row of sub-pixels among the plurality of sub-pixels are sorted by color or column number of each sub-pixel.

It should be noted that the sorting of the charging order is related to the number of multiplexing channels. Among the plurality of sub-pixels, if the number of multiplexing channels is the same as the number of color types, each row of sub-pixels can be sorted into a charging order according to the color of sub-pixel, and the color order of sub-pixel in different rows can be different. For example, if the number of multiplexing channels is three, and multiple sub-pixels include red sub-pixels R, green sub-pixels G, and blue sub-pixels B, the charging order corresponding to one row of sub-pixels can be R, G, B. That is, the red sub-pixels R in the row of sub-pixels are charged first, then the green sub-pixels G in the row of sub-pixels are charged, and finally the blue sub-pixels B in the row of sub-pixels are charged. The charging order of the other row of sub-pixels can be G, R, B, etc.

If the number of multiplexing channels is different from the number of sub-pixel color types of multiple sub-pixel, each row of sub-pixels can be sorted into a charging order according to column number of the sub-pixels, and the order of column number in different rows can be different. For example, the number of multiplexing channels is two, and multiple sub-pixels include red sub-pixels R, green sub-pixels G, and blue sub-pixels B.

In that case, the charging order of a row of sub-pixels can be an odd/even rotation, which means that the sub-pixel of odd column in the row may be charged first, and then the sub-pixel of even column in the row of sub-pixels is charged. The charging order of another row of sub-pixels, alternatively, can be a rotation started with even then odd, for example.

In multiple combination of sorting for multiple rows of sub-pixels, different charging orders are sorted for each row of sub-pixels, so that the total number of different colors sub-pixels arranged in the first and last bits of the charging orders are the same. Each of the charging orders corresponding to each row of sub-pixels have a first bit and a last bit. For example, there are N first bits and N last bits in N charging orders corresponding to N rows. If multiple sub-pixels include red sub-pixels R, green sub-pixels G, and blue sub-pixels B, the N first bits and the N last bits are arranged so that 2N/3 bits are arranged for red sub-pixels R, 2N/3 bits are arranged for green sub-pixels G, and 2N/3 bits are arranged for blue sub-pixels B, so that the total numbers of red sub-pixels R, green sub-pixels G, and blue sub-pixels B coincide the sum of the first and last bits 2N.

Figure 3:
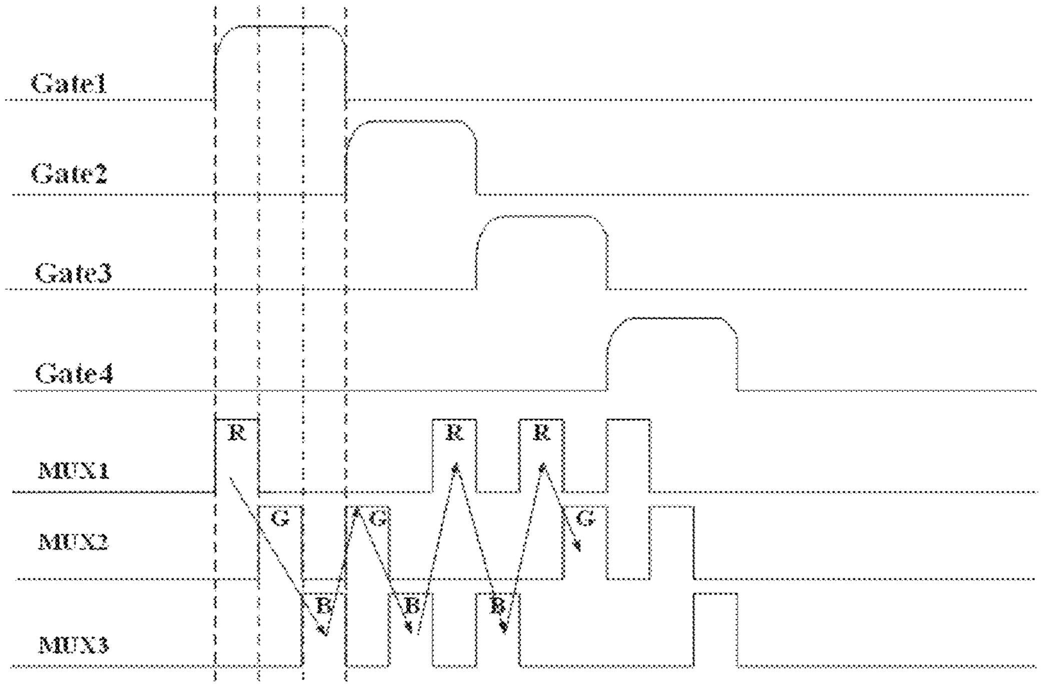
FIG. 3 shows a sequence diagram of a scanline and multiplexing channel in the driving method of the display panel according to an embodiment of the present application.

Since the scan signal has a latency at the beginning and the end, that is, there is a time delay for each scan signal from low level to high level and from high level to low level, such as the scan signal input waveforms Gate1, Gate2, Gate3, Gate4 shown in FIG. 3. As a result, the charging time of sub-pixels arranged in the first and last bits of each row of sub-pixels is shorter than that of those arranged in the middle for charging. Therefore, the total numbers of different color sub-pixels arranged in the first and last bits of multiple sub-pixel are the same, which can ensure equal charging rate for different color sub-pixels among the multiple sub-pixels, hence further ensuring the uniformity of display quality.

Although there are latencies at the beginning and the end of the scan signal, the starting and ending latencies may be different. That is, the latency for each row of sub-pixels when the scan signal switches from low-level to high-level may be different from that from high-level to low-level. Therefore, to further ensure that the charging rate of different color sub-pixel in multiple sub-pixels is statistically unified, it is possible to individually unify the total numbers of different color sub-pixels arranged at the first position, and unify the total number of different color sub-pixel arranged in the second position, respectively. In that case, the first position comprises the first bit in the charging order corresponding to each row of sub-pixels, and the second position comprises the last bit in the charging order corresponding to each row of sub-pixels.

For example, given there are N first bits and N last bits in the charging order corresponding to N rows of sub-pixels. If multiple sub-pixels include red sub-pixels R, green sub-pixels G, and blue sub-pixels B, N/3 first bits are arranged for the red sub-pixels R, N/3 first bits are arranged for green sub-pixels G, and N/3 first bits are arranged for blue sub-pixels B. Likewise, N/3 last bits are arranged for red sub-pixels R, N/3 last bits are arranged for green sub-pixels G, and N/3 last bits are arranged for blue sub-pixels B. As such, the total numbers of red sub-pixels R, green sub-pixels G, and blue sub-pixels B arranged in the first bits are the same, and the total numbers of red sub-pixels R, green sub-pixels G, and blue sub-pixels B in the last bits are the same.

To ensure the uniformity of local display, the charging rate of local pixels can be individually equalized. Specifically, the charging order for each row of sub-pixels among the plurality of sub-pixels can be sorted, so that total numbers of different color sub-pixels arranged at a target position are the same. Detailed steps are as below.

Multiple rows of sub-pixels are divided into a plurality of groups, with the number of sub-pixel rows in each group coinciding the number of multiplexing channels. Charging orders are sorted for each row of sub-pixels in each group, so that the total numbers of different color sub-pixels arranged at the target position in each group are the same.

In this embodiment, a plurality of rows of sub-pixels in a plurality of sub-pixels are grouped according to the row arrangement order, and the number of sub-pixel rows in each group is related to the number of multiplexing channels. For example, given that a plurality of sub-pixels include 12 rows of sub-pixels, if the number of multiplexing channels is two, every two rows of sub-pixel can be divided into a group, namely, the first and second rows of sub-pixels form a group, the third and the fourth rows of sub-pixels form a group, . . . , the eleventh and the twelfth rows of sub-pixels form a group. If the number of multiplexing channels is three, every three rows of sub-pixels can be divided into a group, that is, the first to third rows of sub-pixels are a group, the fourth to sixth rows of sub-pixels are a group, and the tenth to twelfth rows of sub-pixels are a group. If the number of multiplexing channels is six, then every six rows of sub-pixels can be divided into a group, that is, the sub-pixel from the first to sixth rows are a group, and the sub-pixels from the seventh to twelfth rows are one group.

After grouping, by sorting the charging order for the sub-pixels in each row of a group, the total numbers of different color sub-pixels in the first and last bits of the group can be the same. Furthermore, the total number of different color sub-pixel arranged in the first bit of the group is the same, and the total number of different color sub-pixel arranged in the last bit of the group is the same, so as to ensure that the area corresponding to different color sub-pixels in the group is spatially blended to prevent undesirable display effects such as horizontal and vertical stripes.

For example, as shown in FIG. 2, the display panel comprises three multiplexing channels MUX1, MUX2, and MUX3. Therefore, every three rows of sub-pixels 21 can be divided into a group, that is, the first row of sub-pixels 21, the second row of sub-pixels 21 and the third row of sub-pixels 21 are in one group. A charging order for the first row of sub-pixels 21, the second row of sub-pixels 21, and the third row of sub-pixels 21 are sorted. For example, given that the charging order of sub-pixels 21 in the first row is R, G, and B, so that the first bit in charging order is R, and the last bit is B. Given that the charging order of sub-pixels 21 in the second row is G, B, and R, that makes the first bit in the charging order G, and the last bit R. Likewise, given that the charging order corresponding to sub-pixels 21 in the third row is B, R, and G, the first bit in the charging order would be B, whereas the last bit is G. As such, the total numbers of R, G, and B arranged in the first bit are the same, and the total numbers of R, G, and B arranged in the last bit are the same, as shown in FIG. 3.

Wherein, the charging orders corresponding to multiple rows of sub-pixels in different groups can be same or different. For example, in FIG. 2, the fourth row of sub-pixels 21 to the sixth row of sub-pixels 21 are another group, the charging order of sub-pixels 21 in the fourth row can be R, B, G, the charging order corresponding to sub-pixels 21 in the fifth row can be B, G, R, and the charging order corresponding to sub-pixels 21 in the sixth row can be G, R, B, being different from the charging order corresponding to sub-pixels 21 from the first row to the third row. As long as the total numbers of multiple color sub-pixels arranged in the first and last bits of a group are same, the variety of embodiment is not specifically limited.

In a further embodiment, the display panel comprises six multiplexing channels, so every six rows of sub-pixels can be a group, for example, the sub-pixel from the first to sixth rows are a group, and the sub-pixel arrangement pattern in each row is "RGBRGBRGB". The sub-pixel charging order of the first to sixth rows is a sequence of column numbers 6n+1, 6n+2, 6n+3, 6n+4, 6n+5, and 6n+6, where n=0 and 1. That is, the first sub-pixels to be charged are in the first and seventh column, comprising two Rs. The last sub-pixels to be charged are in the sixth and twelfth columns, comprising two Bs. For the second rows of sub-pixels, the corresponding charging order is a sequence of column numbers 6n+2, 6n+1, 6n+3, 6n+4, 6n+6, and 6n+5. That is, the first sub-pixels to be charged based on the charging order are the second and eighth columns, comprising two Gs. Conversely, in the charging order, the sub-pixels arranged in the last position are the fifth and eleventh columns, comprising two Gs. Furthermore, the charging order for the third row of sub-pixels is a sequence of column number 6n+3, 6n+2, 6n+1, 6n+6, 6n+5, and 6n+4. That is, the first sub-pixels in the charging order are the third and ninth columns, comprising two Bs. The last sub-pixels of the third row are the fourth and tenth columns according to the charging order, comprising two Rs. The charging order for the fourth row of sub-pixels is a sequence of column number 6n+4, 6n+2, 6n+1, 6n+6, 6n+5, and 6n+3. That is, the sub-pixels firstly charged based on the charging order are in the fourth and tenth columns, comprising two Rs. The last sub-pixels of the fourth row to be charged in the charging order are the third and ninth columns. The charging order for the fifth row of sub-pixels is a sequence of column number 6n+5, 6n+4, 6n+1, 6n+6, 6n+3, and 6n+2. That is, the sub-pixels firstly charged based on the charging order are in the fifth and eleventh columns, comprising two Gs. The last sub-pixels of the fifth row to be charged in the charging order are the second and eighth columns, comprising two Gs. The charging order for the sixth row of sub-pixels is a sequence of column number 6n+6, 6n+5, 6n+4, 6n+3, 6n+2, and 6n+1. That is, the sub-pixels firstly charged based on the charging order are in the sixth and twelfth columns, comprising two Bs. The last sub-pixels of the sixth row to be charged in the charging order are the first and seventh columns, comprising two Rs. In the group of sub-pixels from the first to sixth rows, the first sub-pixels arranged in the charging order include 4Rs, 4Gs and 4Bs, that is, the total number of the first bits in the charging order are the same. Likewise, the last sub-pixels arranged in the charging order comprise 4Rs, 4Gs, and 4Bs. Since the numbers of R, G, and B sub-pixels arranged in the last bit of the charging order are same, the equality of charging rates of the R, G, and B sub-pixels in the group can be assured.

In step 102, when scanning each row of sub-pixels, each sub-pixel in a row is charged to drive the display panel according to the charging order corresponding to the row.

In the embodiment, when each row of sub-pixels are scanned, the charging timing of each sub-pixel is determined by the signal timing of the multiplexing channel. Therefore, after determining the charging order of each row of sub-pixels, the signal timing of multiplexing channel can be set according to the charging order of sub-pixel in each row, such that the sub-pixels in the row sub-pixel are charged according to the charging order.

For example, as shown in FIG. 3, given that the display panel comprises three multiplexing channels MUX1, MUX2, and MUX3, and the display panel comprises three types of color sub-pixels R, G, and B, each multiplex channel controls one color sub-pixel, respectively. For example, the MUX1 controls the red sub-pixels R, the MUX2 controls the green sub-pixels G, and the MUX3 controls the blue sub-pixels B. In the group of sub-pixels in the first to third rows, the charging order corresponding to the first row of sub-pixels is RGB. Therefore, the signal sequence of the three multiplex channels is MUX1, MUX2, and MUX3. That is, when the first row of sub-pixels is scanned, the scan signal is transmitted from the scanline Gate1 to the first row of sub-pixels. The MUX1 first outputs a multiplex signal to charge the red sub-pixels R through a corresponding data line. Thereafter, the MUX2 outputs a multiplex signal to charge the green sub-pixels G through a corresponding data line. Finally, the MUX3 outputs a multiplex signal to charge the blue sub-pixels B through a corresponding data line. It is a known issue that a latency exists between the start and end of the scan signal, therefore, the charging time of sub-pixels R and B are shorter than that that of the sub-pixels G of the first row of sub-pixels. Similarly, when the second row of sub-pixels is scanned, the signal sequence of the three multiplexing channels is MUX2, MUX3, and MUX1, which successively charges the green sub-pixels G, blue sub-pixels B, and red sub-pixels R, respectively. In the second row of sub-pixels, the charging time of sub-pixels R and G are shorter than that of subpixels B. When the third row of sub-pixels is scanned, the signal sequence of the three multiplexing channels is MUX3, MUX1, and MUX2. Therefore, the blue sub-pixels B, red sub-pixels R, and green sub-pixels G are successively charged respectively. In the third row, the charging time of sub-pixels B and G are shorter than that of the sub-pixels R. Nevertheless, each of the charging time of color sub-pixels R, G, and B are maintained same during the scanning of the three rows. That is to say, the charging rates of R, G, and B are respectively the same during the scanning of the three rows, such that the corresponding area of the three rows of sub-pixels are uniformly displayed.

The color category of sub-pixel corresponding to each multiplexing channel is not specifically fixed. For example, the MUX1 can control the green sub-pixels G, the MUX2 can control the blue sub-pixels B, and the MUX3 can control the red sub-pixels R. Any variation is allowed as long as a multiplex channel is assured to have control of one type of color sub-pixels.

The embodiment of the present application can sort a charging order for the sub-pixels of each row in a multi-row sub-pixel array, so that the total numbers of different color sub-pixels arranged at a target position are same, wherein the target position comprises a first bit and a last bit in the charging order corresponding to each row of sub-pixels, and when a row of sub-pixels is scanned, the sub-pixel in the row is charged according to the charging order, thereby the overall charging rates of different color sub-pixels are assured same, so as to prevent uneven display issues such as horizontal and vertical stripes, and hence the display quality of the display panel can be improved.

The embodiment of the application also provides a driver device for the display panel, which can respectively realize all processes of the driving method of the display panel in the above embodiment.

Figure 4:
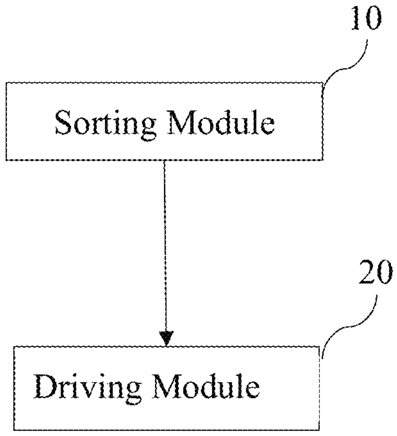
FIG. 4 is a structural schematic diagram of a driver device of the display panel according to an embodiment of the present application.

As shown in FIG. 4, the embodiment of the present application provides a driver device for a display panel, wherein the display panel comprises a plurality of sub-pixels distributed in multiple rows and columns, and the plurality of sub-pixels comprise a plurality of color sub-pixels. The device comprises the following features.

A sorting module 10, adaptable for sorting a charging order for each row of sub-pixels among the plurality of sub-pixels, making total numbers of different color sub-pixels arranged at a target position same, and the target position comprises the first and last bit in the charging order corresponding to each row of sub-pixel.

A driving module 20, adaptable to charge each sub-pixel in the row according to the charging order corresponding to the sub-pixel of the row to drive the display panel when scanning each row of sub-pixels.

Furthermore, the target position comprises a first position and a second position, the first position comprises the first bit in the charging order corresponding to each row of sub-pixels, and the second position comprises the last bit in the charging order corresponding to each row of sub-pixels.

The total number of different color sub-pixels among the plurality of sub-pixels is the same at the first position, and the total number of different color sub-pixels among the plurality of sub-pixels arranged at the second position is the same.

Further, the sorting module 10 is also adaptable for the following functions.

The sorting module 10 sorts the charging order for each row of sub-pixels among the plurality of sub-pixel according to the color of the sub-pixel or the number of sub-pixel columns.

Furthermore, the display panel also comprises a plurality of multiplexing channels.

The sorting module 10 is also adaptable for the following functions.

The sorting module 10 divides multiple rows of sub-pixels into multiple groups so that the number of sub-pixel rows in each group coincide the number of multiplexing channels.

The sorting module 10 sorts the charging order for each row of sub-pixels in each group, so that the total numbers of different color sub-pixels in each group arranged at the target position are the same.

Furthermore, the charging order corresponding to the multi row sub-pixel in different groups is the same or different.

The embodiment of the application can sort a charging order for each row of sub-pixels in a multi-row sub-pixel array, so that the total number of different color sub-pixels arranged at the target position is the same. The target position comprises a first bit and a last bit in the charging order corresponding to each row of sub-pixels. When the rows of sub-pixels are scanned, the sub-pixels in one of the rows are charged in a sequence defined by the charging order corresponding to the row, so that overall charging rates of different color sub-pixels are ensured same. As a result, the uneven display issues such as horizontal and vertical stripes can be prevented, hence improving the display quality of the display panel.

Figure 5:
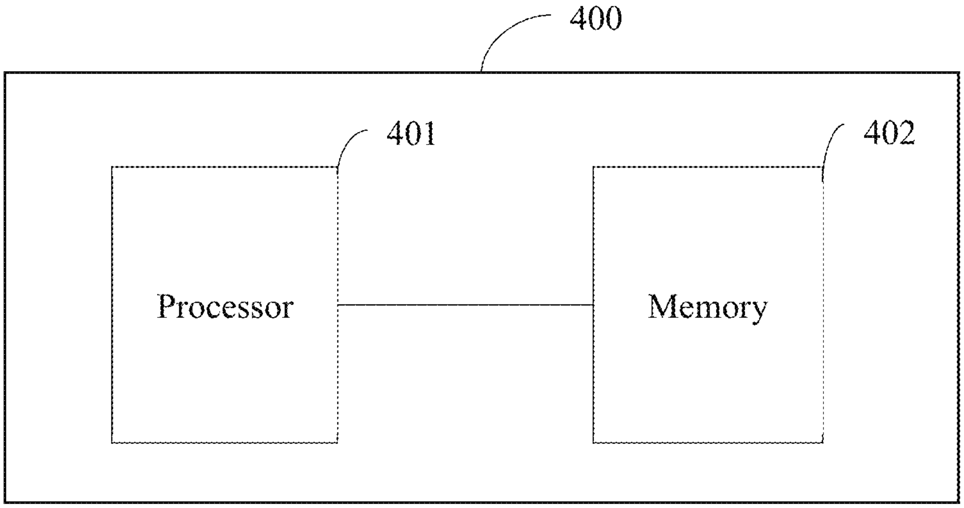
FIG. 5 is a structural schematic diagram of a display terminal according to an embodiment of the present application.

A further embodiment of the application also provides a display terminal, which can be a smart phone, a flat panel computer, a TV and/or other equipment. As shown in FIG. 5, a display terminal 400 comprises a processor 401 and a memory 402, wherein the processor 401 is electrically connected with the memory 402.

The processor 401 is the control center of the display terminal 400 which connects all parts of the whole display terminal by using various interfaces and rows, adaptable for running or loading application programs stored in the memory 402, and calling data stored in the memory 402. The processor 401 performs various functions and processing data of the display terminal, so as to monitor the display terminal as a whole. In this embodiment, the sorting module 10 and the driver module 20 shown in FIG. 4 may be applications stored in the memory 402. The processor 401 in the display terminal 400 executes the sorting module 10 and the driver module 20 stored in the memory 402 to realize various functions. When the sorting module 10 is executed by the processor 401, it is adaptable for sorting the charging order for each row of sub-pixels among the plurality of sub-pixels, so that total numbers of different color sub-pixels arranged at a target position are the same, and the target position comprises the first and last bits in the charging order corresponding to each row of sub-pixels. When the driver module 20 is executed by the processor 401, it is adaptable for charging each sub-pixel in the row in a sequence according to the charging order corresponding to the row to drive the display panel.

Figure 6:
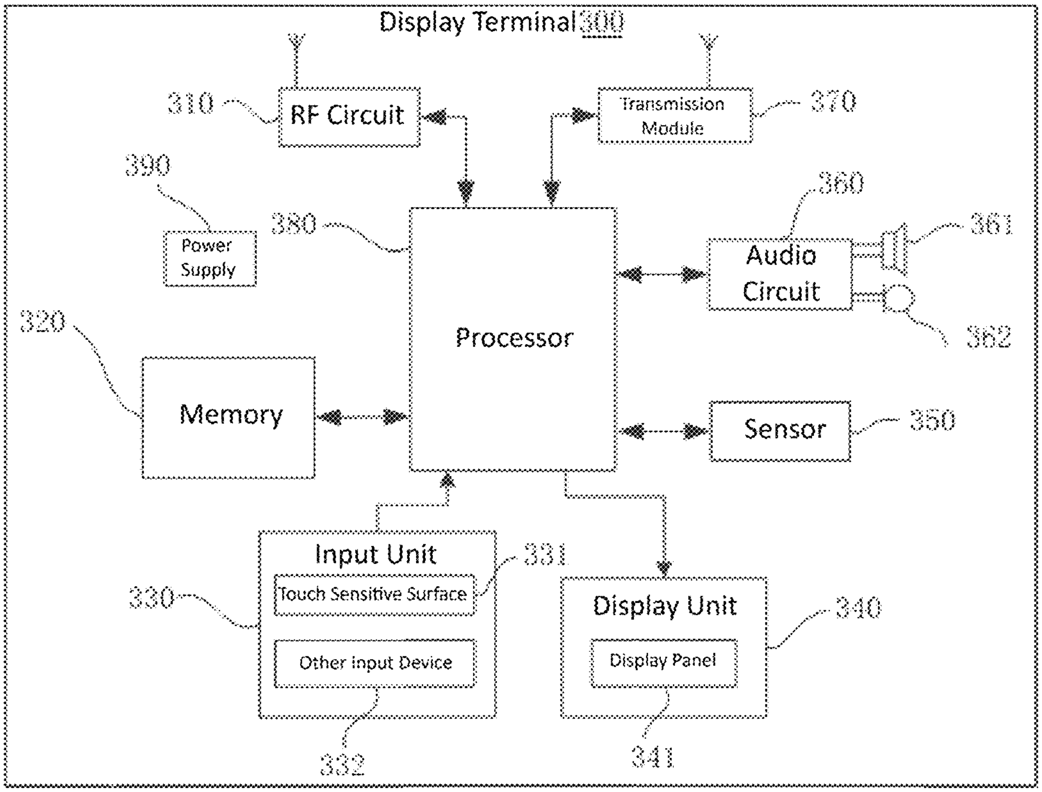
FIG. 6 is another structural diagram of another display terminal according to an embodiment of the present application.

Please refer to FIG. 6, which is the structural diagram of the display terminal according to an embodiment of the application. The display terminal 300 may include an RF circuit 310, a memory 320 comprising one or more computer-readable storage media, an input unit 330, a display unit 340, a sensor 350, an audio circuit 360, a speaker 361, a microphone 362, a transmission module 370, a processor 380 comprising one or more processing cores, and a power supply 390, and so on. It can be understood by those skilled in the art that the display terminal structure shown in FIG. 6 does not constitute a limitation on the display terminal, and may include more or fewer components than shown in the figure, or combine some components, or have different component arrangements.

The RF circuit 310 is adaptable for receiving and transmitting electromagnetic waves, realizing mutual conversion between electromagnetic waves and electrical signals, so as to communicate with communication network or other equipment. The RF circuit 310 may include various existing circuit elements for performing these functions, such as an antenna, a radio frequency transceiver, a digital signal processor, an encryption/decryption chip, a user identity module (SIM) card, a memory, and the like. The RF circuit 310 can communicate with various networks such as Internet, Intranet, wireless network, or other devices through wireless network. The wireless network may include a cellular telephone network, a wireless local area network or a metropolitan area network. The above wireless network can use various communication standards, protocols and technologies, comprising but not limited to global system for mobile communication (GSM), enhanced data GSM environment (EDGE), wideband code division multiple access (WCDMA), Code Division Access (CDMA), Time division multiple access (TDMA), wireless fidelity (WiFi) (as shown in IEEE 802.1 La, IEEE 802.11b, IEEE802.11g and/or IEEE 802n), voice over Internet Protocol (VoIP), worldwide interoperability for microwave access (WiMAX), other protocols for email, instant messaging and SMS, and any other suitable communication protocols, even those that have not yet been developed.

The memory 320 can be used to store software programs and modules, and processor 380 can perform various function applications and data processing by running software programs and modules stored in memory 320, that is, to realize the function of automatic light compensation for front camera photographing. The memory 320 may include a high-speed random access memory, and may also include a non-volatile memory, such as one or more magnetic memory devices, flash memory, or other nonvolatile solid-state memory. In some examples, the memory 320 may further include memory set remotely relative to processor 380, which may be connected to the display terminal 300 through a network. Examples of the above networks include but are not limited to the Internet, intranet, LAN, mobile communication network and combinations thereof.

The input unit 330 may be used to receive input digital or character information and to generate keyboard, mouse, joystick, optical or trackball signal inputs related to user settings and function control. Specifically, the input unit 330 may include a touch sensitive surface 331 and other input devices 332. The touch sensitive surface 331, also known as touch screen or touch panel, can collect the user's touch operations on or near the touch sensitive surface 331 (such as the user's operation on or near the touch sensitive surface 331 by using any suitable object or accessory such as finger, stylus, etc.), and drive a corresponding connecting device according to the preset program. Alternatively, the touch sensitive surface 331 may include a touch detection device and a touch controller. Wherein, the touch detection device detects the user's touch position, detects the signal brought by the touch operation, and transmits the signal to the touch controller. The touch controller receives the touch information from the touch detection device, converts it into the contact coordinates, and sends it to the processor 380, and can receive and execute the command from the processor 380. In addition, the touch sensitive surface 331 can be realized by using resistance type, capacitance type, infrared ray, and surface acoustic wave. In addition to the touch sensitive surface 331, the input unit 330 may also include other input devices 332. Specifically, other input devices 332 may include, but are not limited to, one or more of a physical keyboard, a function key (such as a volume control key, a switch button, etc.), a trackball, a mouse, a joystick, etc.

The display unit 340 may be used to display information input by or provided to the user and the display terminal 300. These GUI can be composed of graphics, text, icon, video, and any combination thereof. The display unit 340 may include a display panel 341, optionally, the display panel 341 can be configured in the form of a liquid crystal display (LCD), an organic light emitting diode (OLED), etc. Further, the touch sensitive surface 331 may cover the display panel 341. When the touch sensitive surface 331 detects a touch operation on or near the touch sensitive surface 331, the incident is transmitted to the processor 380 to determine the type of the touch event, and thereafter, the processor 380 provides a corresponding visual output on the display panel 341 according to the type of the touch event. Although in FIG. 5, the touch sensitive surface 331 and the display panel 341 are used as two independent components to realize the input and output functions, in some embodiments, the touch sensitive surface 331 and the display panel 341 can be integrated to realize the input and output functions.

The display terminal 300 may also include at least one sensor 350, such as an optical sensor, a motion sensor, and other sensors. Specifically, the light sensor may include an ambient light sensor and a proximity sensor, wherein the ambient light sensor can adjust the brightness of the display panel 341 according to the light and shade of the ambient light, and the proximity sensor can turn off the display panel 341 and/or backlight when the display terminal 300 moves to the ear. As a kind of motion sensor, the gravity acceleration sensor can detect the acceleration in all directions (generally three-axis), and can detect the magnitude and direction of gravity when it is still. It can be used to identify mobile phone posture applications (such as horizontal and vertical screen switching, related games, magnetometer attitude calibration), vibration identification related functions (such as pedometer, tapping), etc. As for the display terminal 300, a gyroscope, barometers, hygrometers, thermometers, infrared sensors, and other sensors not described here can also be configured, for which the detailed descriptions are omitted herein.

An audio interface between the user and the display terminal 300 may be provided by an audio circuit 360, a speaker 361, and a microphone 362. The audio circuit 360 can transmit the received audio data converted from electrical signals to the speaker 361, which is further converted into sound signal output. On the other hand, the microphone 362 converts the collected sound signal into electrical signal, which is received by the audio circuit 360 and converted into audio data, and then processed by the audio data output processor 380, and transmitted to another terminal, for example, through the RF circuit 310. Alternatively, the audio data may be output to the memory 320 for further processing. The audio circuit 360 may also include an earplug jack to provide communication between the peripheral headset and the display terminal 300.

The display terminal 300 employs the transmission module 370 (such as WiFi module) to help users send and receive e-mail, browse webpages, and access streaming media, etc., which provides users with wireless broadband Internet access. Although the transmission module 370 is shown in the figure, it can be understood that it does not belong to the necessary composition of the display terminal 300, and can be omitted as required without changing the essence of the invention.

The processor 380 is the control center of display terminal 300. It uses various interfaces and rows to connect all parts of the whole mobile phone, runs or executes software programs and/or modules stored in memory 320, and calls data stored in memory 320. It performs various functions and processing data of display terminal 300, so as to monitor the whole mobile phone. Alternatively, the processor 380 may include one or more processing cores. In some embodiments, the processor 380 may integrate an application processor and a modem processor, wherein the application processor mainly processes the operating system, the user interfaces, and the application programs, whereas the modem processor mainly processes wireless communications. It can be understood that the above-mentioned modem processor may not be integrated into the processor 380.

The display terminal 300 also comprises a power supply 390 (such as a battery) to power various components. In some embodiments, the power supply can be logically connected with processor 380 through the power management system, so as to realize the functions of charging, discharging and power management through the power management system. The power supply 390 may also include one or more DC or AC power supplies, a recharging system, a power failure detection circuit, a power converter or inverter, a power status indicator, and etc.

Although not shown, the display terminal 300 may also include a camera (such as a front camera, a rear camera), a Bluetooth module, and the like, which will not be repeated here. Specifically, in this embodiment, the display unit of the display terminal 300 is a touch screen display, and the display terminal 300 also includes a memory 320. The sorting module 10 and the driver module 20 shown in FIG. 4 may be application programs stored in the memory 320. The processor 380 in the display terminal 300 operates the sorting module 10 and the driver module 20 stored in the memory 320 to realize various functions. When the sorting module 10 is executed by the processor 380, it is used for sorting of the charging orders of the plurality of sub-pixels per row, so that the total numbers of different color sub-pixels arranged at the target position are maintained same. The target position includes the first bit and the last bit of the charging sequences of the rows respectively. When the driver module 20 is executed by the processor 380, it is used to charge the sub-pixels in a row according to the charging sequence corresponding to the row, so as to drive the display panel.

In the specific implementation, the aforementioned modules can be realized as independent entities, or can be arbitrarily combined as the same or several entities. For the specific implementation of the above modules, please refer to the previous method implementation examples, and will not repeat here.

The general technical personnel in the field can understand that all or part of the steps in the various methods of the above embodiments can be completed by instructions or by instructions related to hardware control, which can be stored in a computer-readable storage medium and loaded and executed by the processor. Therefore, the embodiment of the invention provides a storage medium in which a plurality of instructions are stored, which can be loaded by the processor to perform the steps in the driving method of any display panel provided by the embodiment of the invention.

The storage medium type can include read only memory (ROM), random access memory (RAM), disk or optical disk, etc.

Since the instructions stored in the storage medium can execute the steps in the driving method of any display panel provided by the embodiment of the present invention, the beneficial effects that can be achieved by any driving method of the display panel provided by the embodiment of the invention can be realized. See the previous embodiment for details, and will not be repeated here.

The specific implementation of the above operations can be seen in the previous embodiment and will not be repeated here.

In summary, although the application has disclosed the above with preferred embodiments, the above preferred embodiments are not intended to limit the application. Ordinary technical personnel in the art can make various modifications and refinements without departing from the spirit and scope of the application. Therefore, the scope of protection of the application is subject to the scope defined in the claims.

What is claimed is:

1. A driving method for a display panel, the display panel comprising a plurality of sub-pixels distributed in multiple rows and columns, and the plurality of sub-pixels comprising a variety of color sub-pixels, wherein the method comprises:

sorting a charging order for each row of sub-pixels among the plurality of sub-pixels, so that total numbers of different color sub-pixels arranged at a target position are the same, wherein the target position comprises a first bit and a last bit in the charging order corresponding to each row of sub-pixels; and when scanning the sub-pixels in each row, charging each sub-pixel in the row to drive the display panel according to the charging order corresponding to the row, wherein:

the target position comprises a first position and a second position, the first position comprises the first bit in the charging order corresponding to each row of sub-pixels, and the second position comprises the last bit in the charging order corresponding to each row of sub-pixels;

the total numbers of different color sub-pixels among the plurality of sub-pixels arranged at the first position are the same, and the total numbers of different color sub-pixels among the plurality of sub-pixels arranged at the second position are the same.

2. The driving method of the display panel according to claim 1, wherein:

the sorting of the charging order for each row of sub-pixels among the plurality of sub-pixels comprises:

sorting each row of sub-pixels among the plurality of sub-pixels by color or a column number of each sub-pixel.

3. The driving method of the display panel according to claim 1, wherein:

the display panel further comprises a plurality of multiplexing channels;

the step of sorting the charging order for each row of sub-pixels among the plurality of sub-pixels, so that the total numbers of different color sub-pixels arranged at the target position are the same, comprising:

dividing multiple rows of sub-pixels into a plurality of groups so that a number of rows in each group coincides a number of the multiplexing channels; and sorting charging orders for each row of sub-pixels in each group so that total numbers of different color sub-pixels in each group arranged at the target position are the same.

4. The driving method of the display panel according to claim 3, wherein charging orders of different groups of rows are the same or different.

5. The driving method of the display panel according to claim 1, wherein charging orders corresponding to different rows of sub-pixels are the same or different.

6. A driver device for a display panel, wherein the display panel comprises plurality of sub-pixels arranged in rows and columns, and the sub-pixels comprise various color sub-pixels, the driver device comprising:

a sorting module, configured to sort a charging order for each row of sub-pixels among the plurality of sub-pixels, so that total numbers of different color sub-pixels arranged at a target position are the same, and the target position comprises a first bit and a last bit in the charging order corresponding to each row of sub-pixels; and a driver module, configured to, when scanning each row of sub-pixels, charge each sub-pixel of the row based on the charging order corresponding to the row, so as to drive the display panel, wherein:

the target position comprises a first position and a second position, the first position comprises the first bit in the charging order corresponding to each row of sub-pixels, and the second position comprises the last bit in the charging order corresponding to each row of sub-pixels;

the total numbers of different color sub-pixels among the plurality of sub-pixels arranged at the first position are the same, and the total numbers of different color sub-pixels among the plurality of sub-pixels arranged at the second position are the same.

7. The driver device of the display panel according to claim 6, wherein the sorting module is also configured to sort each row of sub-pixels among the plurality of sub-pixels by color or a column number of each sub-pixel.

8. The driver device of the display panel according to claim 6, wherein:

the display panel further comprises a plurality of multiplexing channels;

the sorting module is also configured to divide multiple rows of sub-pixels into a plurality of groups so that a number of rows in each group coincides a number of the multiplexing channels; and sorting charging orders for each row of sub-pixels in each group so that total numbers of different color sub-pixels in each group arranged at the target position are the same.

9. The driver device of the display panel according to claim 8, wherein charging orders of different groups of rows are the same or different.

10. The driver device of the display panel according to claim 6, wherein charging orders corresponding to different rows of sub-pixels are the same or different.

11. A display terminal, comprising a display panel, wherein the display panel comprises plurality of sub-pixels arranged in rows and columns, and the sub-pixels comprise various color sub-pixels, the display terminal further comprises a processor and a memory, the memory is configured to store instructions and data, and the processor is configured to perform the following steps:

sorting a charging order for each row of sub-pixels among the plurality of sub-pixels, so that total numbers of different color sub-pixels arranged at a target position are the same, and the target position comprises a first bit and a last bit in the charging order corresponding to each row of sub-pixels; and when scanning the sub-pixels in each row, charging each sub-pixel in the row to drive the display panel according to the charging order corresponding to the row, wherein:

the target position comprises a first position and a second position, the first position comprises the first bit in the charging order corresponding to each row of sub-pixels, and the second position comprises the last bit in the charging order corresponding to each row of sub-pixels;

the total numbers of different color sub-pixels among the plurality of sub-pixels arranged at the first position are the same, and the total numbers of different color sub-pixels among the plurality of sub-pixels arranged at the second position are the same.

12. The display terminal according to claim 11, wherein the of the charging order for each row of sub-pixels among the plurality of sub-pixels, comprising:

sorting each row of sub-pixels among the plurality of sub-pixels by color or a column number of each sub-pixel.

13. The display terminal according to claim 11, wherein the display panel further comprises a plurality of multiplexing channels;

the sorting of the charging order for each row of sub-pixels among the plurality of sub-pixels, so that the total numbers of different color sub-pixels arranged at the target position are the same, comprising:

dividing multiple rows of sub-pixels into a plurality of groups so that a number of rows in each group coincides a number of the multiplexing channels; and sorting charging orders for each row of sub-pixels in each group so that total numbers of different color sub-pixels in each group arranged at the target position are the same.

14. The display terminal according to claim 13, wherein charging orders of different groups of rows are the same or different.

15. The display terminal according to claim 11, wherein charging orders corresponding to different rows of sub-pixels are the same or different.

* * * * *